United States Patent
Jeon et al.

(10) Patent No.: US 10,399,857 B2
(45) Date of Patent: Sep. 3, 2019

(54) METHOD OF PREPARING HYDROPHOBIC METAL OXIDE-SILICA COMPOSITE AEROGEL AND HYDROPHOBIC METAL OXIDE-SILICA COMPOSITE AEROGEL PREPARED THEREBY

(71) Applicant: LG CHEM, LTD., Seoul (KR)

(72) Inventors: Hyun Woo Jeon, Daejeon (KR); Jong Hun Kim, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 46 days.

(21) Appl. No.: 15/537,188

(22) PCT Filed: Oct. 18, 2016

(86) PCT No.: PCT/KR2016/011700
§ 371 (c)(1),
(2) Date: Jun. 16, 2017

(87) PCT Pub. No.: WO2017/078294
PCT Pub. Date: May 11, 2017

(65) Prior Publication Data
US 2018/0002182 A1    Jan. 4, 2018

(30) Foreign Application Priority Data
Nov. 3, 2015 (KR) .................. 10-2015-0153869

(51) Int. Cl.
*B01J 20/10* (2006.01)
*C01B 33/158* (2006.01)
*B01J 13/00* (2006.01)
*C08K 3/36* (2006.01)

(52) U.S. Cl.
CPC ......... *C01B 33/158* (2013.01); *B01J 13/0091* (2013.01); *C01B 33/1585* (2013.01); *C08K 3/36* (2013.01); *C01P 2006/11* (2013.01); *C01P 2006/12* (2013.01); *C01P 2006/90* (2013.01)

(58) Field of Classification Search
CPC .................................................. C01B 33/158
See application file for complete search history.

(56) References Cited

U.S. PATENT DOCUMENTS 3,131,072 A   4/1964   Taulli
7,736,611 B2  6/2010   Norberg et al.

2001/0034375 A1  10/2001  Schwertfeger et al.
2008/0034968 A1   2/2008  Norberg et al.
2011/0000370 A1   1/2011  Norberg et al.
2013/0106008 A1   5/2013  Ahn et al.
2014/0323589 A1  10/2014  Lazar et al.

FOREIGN PATENT DOCUMENTS

| CN | 1241952 A | 1/2000 |
|---|---|---|
| CN | 101132856 A | 2/2008 |
| CN | 102674374 B | 10/2013 |
| JP | 2014051643 A | 3/2014 |
| KR | 20080084241 A | 9/2008 |
| KR | 20100090989 A | 8/2010 |
| KR | 10-2014-0005177 A | 1/2014 |
| KR | 10-2014-0076022 A | 6/2014 |
| KR | 20140146814 A | 12/2014 |
| KR | 20150093122 A | 8/2015 |
| KR | 20150093123 A | 8/2015 |
| WO | 2012/044052 A2 | 4/2012 |

OTHER PUBLICATIONS

Aravind, et al.: "Ambient pressure drying: A successful approach for the preparation of silica and silica based mixed oxide aerogels", XP019792523, Journal of Sol-Gel Science and Technology, vol. 54, No. 1, pp. 105-117, Feb. 6, 2010.
Kwon, et al.: "Ambient-dried silica aerogel doped with TiO2 powder for thermal insulation", Journal of Materials Science, Kluwer Academic Publishers, vol. 35, 2000, pp. 6075-6079.
Aravind, et al.: "Mesoporous silica—alumina aerogels with high thermal pore stability through hybrid sol—gel route followed by subcritical drying", Microporous and Mesoporous Materials, Elsevier, vol. 96, 2006, pp. 14-20.
Aravind, et al.: "Nonsupercritically Dried Silica—Alumina Aerogels—Effect of Gelation pH", Journal of American Ceramic Society, vol. 96, No. 4, 2008, pp. 1326-1328.
Wei, et al.: "Rich photoluminescence emission of SnO2—SiO2 composite aerogels prepared with a co-fed precursor sol—gel process", Journal of the Chinese Institute of Chemical Engineers, Elsevier, vol. 38, 2007, pp. 477-481.
Xu, et al.: "Preparation and characterization of silica-titania aerogel-like balls by ambient pressure drying", Journal of Sol-Gel Science and Technology, vol. 41, 2007, pp. 203-207.

*Primary Examiner* — Stuart L Hendrickson
(74) *Attorney, Agent, or Firm* — Dentons US LLP

(57) ABSTRACT

The present invention relates to a method of preparing a hydrophobic metal oxide-silica composite aerogel having a high specific surface area and a low tap density and a hydrophobic metal oxide-silica composite aerogel prepared thereby. Thus, the preparation method may not only have excellent productivity and economic efficiency due to a relatively simpler preparation process and shorter preparation time than the related art, but may also prepare a hydrophobic metal oxide-silica composite aerogel having a high specific surface area and a low tap density.

15 Claims, 5 Drawing Sheets

METHOD OF PREPARING HYDROPHOBIC METAL OXIDE-SILICA COMPOSITE AEROGEL AND HYDROPHOBIC METAL OXIDE-SILICA COMPOSITE AEROGEL PREPARED THEREBY

CROSS-REFERENCE TO RELATED APPLICATIONS

This application is a National Stage Entry of International Application No. PCT/KR2016/011700 filed on Oct. 18, 2016, which claims priority to and the benefit of Korean Patent Application No. 10-2015-0153869, filed on Nov. 3, 2015, in the Korean Intellectual Property Office, the disclosure of which is incorporated herein in its entirety by reference.

TECHNICAL FIELD

The present invention relates to a method of preparing a hydrophobic metal oxide-silica composite aerogel having a high specific surface area and a low tap density and a hydrophobic metal oxide-silica composite aerogel prepared thereby.

BACKGROUND ART

Since an aerogel, as a high specific area (500 $m^2$/g), ultra-porous material having a porosity of about 90% to about 99.9% and a pore diameter of about 1 nm to about 100 nm, has excellent characteristics such as ultra lightweightness, ultra insulation, and ultra-low dielectric constant, research into the applications of the aerogel as a transparent insulator and an environmentally-friendly high-temperature insulator, an ultra-low dielectric thin film for a highly integrated device, a catalyst and a catalyst support, an electrode for a supercapacitor, and an electrode material for desalination as well as the development of an aerogel material has been actively conducted.

The biggest advantage of the aerogel is super-insulation having a thermal conductivity of 0.300 W/m·K or less which is lower than that of an organic insulation material such as a typical Styrofoam. Also, the aerogel may address fire vulnerability and generation of toxic gas in case of fire, i.e., fatal weaknesses of a typical organic insulation material.

In general, a wet gel is prepared from a silica precursor such as water glass or tetraethoxysilane (TEOS), and an aerogel is then prepared by removing a liquid component in the wet gel without destroying its microstructure. A silica aerogel may be categorized into three typical forms, powder, granules, and monolith, and the silica aerogel is generally prepared in the form of powder.

The silica aerogel powder may be commercialized in a form, such as an aerogel blanket or aerogel sheet, by compositing with fibers, and, since the blanket or sheet has flexibility, it may be bent, folded, or cut to a predetermined size or shape. Thus, the silica aerogel may be used in household goods, such as jackets or shoes, as well as industrial applications such as an insulation panel of a liquefied natural gas (LNG) carrier, an industrial insulation material and a space suit, transportation and vehicles, and an insulation material for power generation. Furthermore, in a case where a silica aerogel is used in a fire door as well as a roof or floor in a home such as an apartment, it has a significant effect in preventing fire.

However, since the silica aerogel powder may be scattered due to high porosity, very low tap density, and small particle size, handling may be difficult and fill may not be easy.

Also, although the silica aerogel monolith has high transparency in visible light region, the silica aerogel monolith may have a size limitation, may be difficult to be molded in various shapes, and may be easily broken.

In order to address the above-described limitations of the silica aerogel powder and monolith, attempts have been made to increase ease of handling and shape-responsiveness by preparing silica aerogel granules having a diameter of 0.5 mm or more. For example, there are methods such as the method in which a reaction solution obtained by hydrolyzing alkoxysilane is prepared as a filler, gelation is performed by polycondensation of the filler with a catalyst, a hydrophobic treatment is performed by reacting with a hydrophobic agent, and supercritical drying is then performed to obtain hydrophobic silica aerogel granules; and the method in which aerogel particles including additives and binder are supplied to a molding machine and compressed to prepare silica aerogel granules.

However, since the above-described methods use an ancillary granulating device and an additive such as a binder, technically complex process and long process time may not only be required, but complex processing procedures and high investment costs may also be required when a silica aerogel is mass-produced by the above-described methods. As a result, a lot of time and expensive chemicals are required, and accordingly, production costs may not only be increased, but also a particle size of the finally obtainable silica aerogel may not be uniform or may be excessively large.

Furthermore, since gel structure characteristics and physical properties are reduced when the silica aerogel absorbs moisture, there is a need to develop a method, which may permanently prevent the absorption of moisture in the air, for ease of use in industry. Thus, methods of preparing a silica aerogel having permanent hydrophobicity by performing a hydrophobic treatment on a surface of the silica aerogel have been proposed, and, recently, a hydrophobic metal oxide-silica composite aerogel is being prepared based on the methods of preparing a silica aerogel having hydrophobicity. A specific example is as follows.

In general, a method of preparing a hydrophobic metal oxide-silica composite aerogel is performed by the steps of: preparing a silica sol by hydrolysis of tetra ethyl ortho silicate (TEOS) or water glass using an acid catalyst, adding a basic catalyst thereto, and performing a condensation reaction to prepare a hydrophilic wet gel (first step); aging the wet gel (second step); performing solvent substitution in which the aged wet gel is put in an organic solvent to substitute water present in the wet gel with the organic solvent (third step); preparing a hydrophobic wet gel by adding a surface modifier to the solvent-substituted wet gel and performing a modification reaction for a long period of time (fourth step); adding an organic solvent to the hydrophobic wet gel to perform additional solvent substitution (fifth step); and preparing a hydrophobic metal oxide-silica composite aerogel by washing and drying the hydrophobic wet gel (sixth step) (see FIG. 1).

However, in a case in which a hydrophobic metal oxide-silica composite aerogel is prepared by using the above method, manufacturing costs may be high and productivity and process continuity may be poor, for example, large amounts of the organic solvent and the surface modifier are required and a lot of time is consumed in the modification reaction. Thus, there are many difficulties in commercialization.

Therefore, there is a need to develop a method which may prepare a hydrophobic metal oxide-silica composite aerogel having excellent physical properties while a preparation process is simple and preparation time is short.

DISCLOSURE OF THE INVENTION

Technical Problem

An aspect of the present invention provides a method of preparing a hydrophobic metal oxide-silica composite aerogel which may prepare a hydrophobic metal oxide-silica composite aerogel having a high specific surface area and a low tap density as well as excellent economic efficiency due to a relatively simpler preparation process and shorter preparation time than the related art.

Another aspect of the present invention provides a hydrophobic metal oxide-silica composite aerogel prepared by the above preparation method.

Technical Solution

According to an aspect of the present invention, there is provided a method of preparing a hydrophobic metal oxide-silica composite aerogel including the steps of: adding a metal ion solution and an acid catalyst to a water glass solution and mixing together to prepare a metal oxide-silica composite gel (step 1); surface-modifying the metal oxide-silica composite gel to prepare a hydrophobic metal oxide-silica composite wet gel (step 2), and drying the hydrophobic metal oxide-silica composite wet gel (step 3), wherein the method further includes treating the metal oxide-silica composite gel with alcohol before the surface modification of step 2.

According to another aspect of the present invention, there is provided a hydrophobic metal oxide-silica composite aerogel prepared by the above method.

Advantageous Effects

A method of preparing a hydrophobic metal oxide-silica composite aerogel according to the present invention may not only have excellent productivity and economic efficiency due to a relatively simpler preparation process and shorter preparation time than the related art, but may also prepare a hydrophobic metal oxide-silica composite aerogel having a high specific surface area and a low tap density.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a method of preparing a hydrophobic metal oxide-silica composite aerogel having excellent physical properties with relatively simpler process steps than a conventional preparation method.

Figure 1:
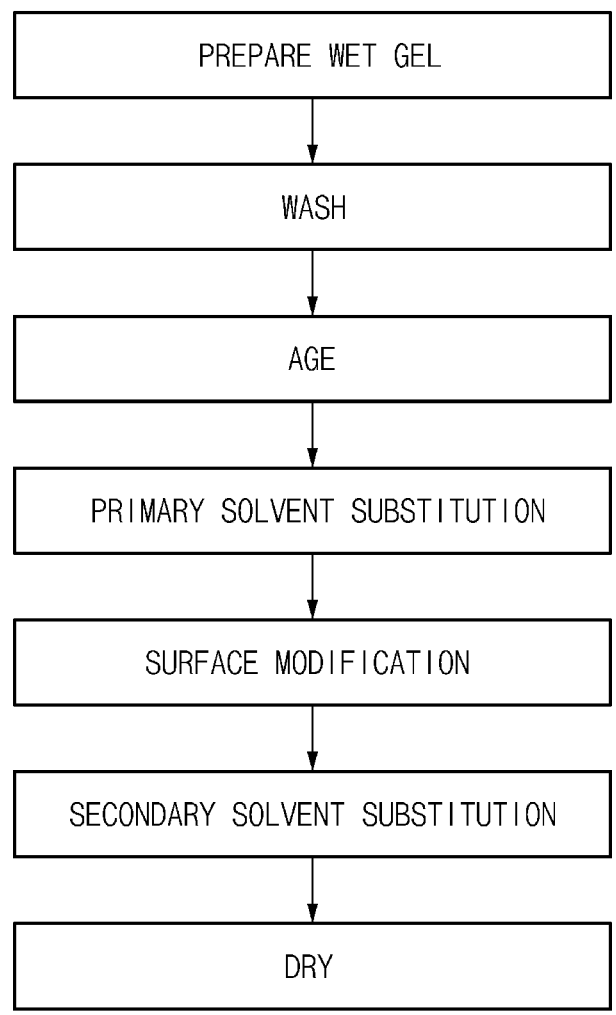
FIG. 1 schematically illustrates a flowchart of a conventional general method of preparing a hydrophobic metal oxide-silica composite aerogel.

In general, a hydrophobic metal oxide-silica composite aerogel is prepared by a method including the steps of: preparing a hydrophilic metal oxide-silica composite wet gel (first step); aging the wet gel (second step, may be skipped); performing primary solvent substitution (third step); performing surface modification (fourth step); performing secondary solvent substitution (fifth step); and washing and drying (sixth step) (see FIG. 1). With respect to the conventional and general preparation method as described above, since multiple process steps may be undertaken and a long period of time is required for surface modification, manufacturing costs are high, and thus, productivity and economic efficiency may be poor. Accordingly, there are difficulties in applying the above preparation method to real industry.

Therefore, the present invention provides a method of preparing a hydrophobic metal oxide-silica composite aerogel having excellent physical properties, such as specific surface area and tap density, as well as excellent productivity and economic efficiency due to relatively simple process steps and short process time.

Hereinafter, a method of preparing a hydrophobic metal oxide-silica composite aerogel according to an embodiment of the present invention will be described in detail with reference to FIGS. 2 and 3.

Figure 2:
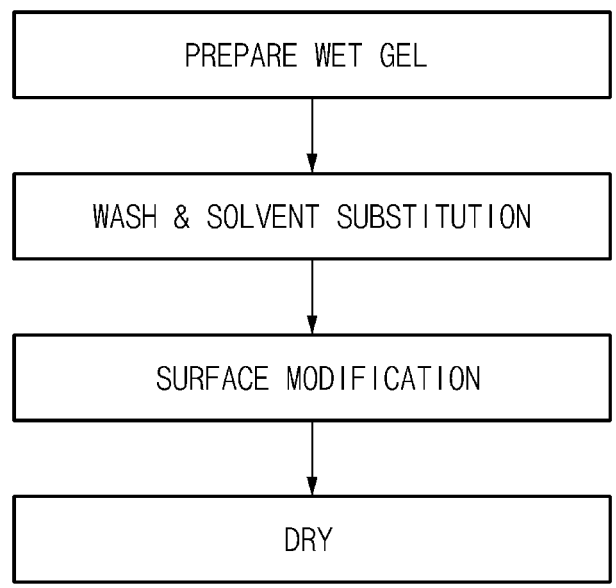
FIG. 2 schematically illustrates a flowchart of a method of preparing a hydrophobic metal oxide-silica composite aerogel according to an embodiment of the present invention.
Figure 3:
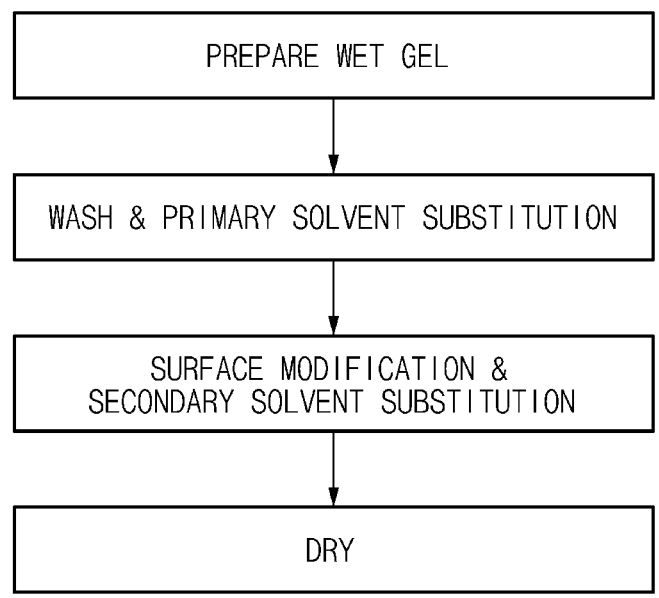
FIG. 3 schematically illustrates a flowchart of a method of preparing a hydrophobic metal oxide-silica composite aerogel according to another embodiment of the present invention.

FIG. 2 schematically illustrates a flowchart of the method of preparing a hydrophobic metal oxide-silica composite aerogel according to the embodiment of the present invention, and FIG. 3 schematically illustrates a flowchart of a method of preparing a hydrophobic metal oxide-silica composite aerogel according to another embodiment of the present invention.

The preparation method according to the embodiment of the present invention includes the steps of: adding a metal ion solution and an acid catalyst to a water glass solution and mixing together to prepare a metal oxide-silica composite gel (step 1); surface-modifying the metal oxide-silica composite gel to prepare a hydrophobic metal oxide-silica composite wet gel (step 2), and drying the hydrophobic metal oxide-silica composite wet gel (step 3).

Also, the preparation method according to the embodiment of the present invention further includes a step of treating the metal oxide-silica composite gel with alcohol before the surface modification of step 2.

Step 1 is a step for preparing a metal oxide-silica composite gel by reacting a water glass solution with a metal ion solution, and may be performed by adding the metal ion solution and an acid catalyst to the water glass solution and mixing together.

In this case, the metal ion solution and the acid catalyst may be simultaneously added in the water glass solution, or, after the metal ion solution is added to the water glass solution and mixed together, the acid catalyst may be sequentially added and mixed therewith. Also, the metal ion solution and the acid catalyst may be added in a mixture state in which the metal ion solution and the acid catalyst are mixed.

The mixing is not particularly limited, but, for example, may be performed by stirring, and the stirring may be performed using a magnetic bar at 300 rpm to 500 rpm within 3 hours. Specifically, the mixing may be performed within 1 hour.

The water glass solution may be a dilute solution in which distilled water is added to water glass and mixed, and the water glass may be sodium silicate ($Na_2SiO_3$) as an alkali silicate salt obtained by melting silicon dioxide ($SiO_2$) and alkali. In this case, the sodium silicate may contain 28 wt % to 30 wt % of silicon dioxide ($SiO_2$). A concentration of water glass in the water glass solution may be in a range of 0.1 M to 2.0 M. That is, the water glass solution may contain the water glass in an amount of 0.1 M to 2.0 M. In a case in which the water glass concentration is less than 0.1 M, a structure of aerogel may not be properly formed, and since the structure may collapse without withstanding a shrinkage phenomenon occurred during drying even if the aerogel is formed, physical properties may be significantly deteriorated. Also, in a case in which the water glass concentration is greater than 2.0 M, since density of the aerogel structure is high, the structure may withstand the shrinkage phenomenon occurred during drying, and thus, the collapse of the structure may be alleviated, but specific surface area characteristics may be reduced.

The metal ion solution may be prepared by dissolving a metal compound in a solvent, and a concentration of metal ions in the metal ion solution may be in a range of 0.05 M to 2.0 M. Specifically, the metal ion solution may be a binary metal ion solution including calcium ions ($Ca^{2+}$) and magnesium ions ($Mg^{2+}$), and, in this case, a molar ratio of the calcium ion ($Ca^{2+}$) to the magnesium ion ($Mg^{2+}$) may be in a range of 1:0.3 to 1:3. That is, the metal ion solution may be one which is prepared by dissolving a calcium compound and a magnesium compound in the solvent, and the calcium compound and the magnesium compound may be calcium chloride and magnesium chloride or a hydrate of calcium chloride and a hydrate of magnesium chloride, respectively. Specifically, the calcium compound may be calcium chloride dihydrate ($CaCl_2.2H_2O$), and the magnesium compound may be magnesium chloride hexahydrate ($MgCl_2.6H_2O$). Also, the solvent is not particularly limited as long as it may sufficiently dissolve the calcium compound and the magnesium compound, but, for example, may be distilled water.

Furthermore, the metal ion solution may be added in an amount such that the metal ions in the solution and the water glass in the water glass solution are easily reacted with each other, and, specifically, the metal ion solution may be added in an amount such that a molar ratio of the metal ions to the water glass contained in the water glass solution is in a range of 0.5 to 1.

The acid catalyst may promote gelation of a metal oxide-silica composite sol, which is formed by the reaction of the water glass in the water glass solution and the metal ions in the metal ion solution, so that the metal oxide-silica composite gel may be easily formed. Specifically, step 1 may be performed at a pH of 6 to 8 so as to facilitate the gelation, and the pH may be adjusted by the acid catalyst. An amount of the acid catalyst used is not particularly limited, but the acid catalyst may be added in an amount such that the pH may be adjusted within the above range.

The acid catalyst is not particularly limited, but may, for example, be at least one selected from the group consisting of hydrochloric acid, nitric acid, acetic acid, sulfuric acid, and hydrofluoric acid.

Step 2 is a step of surface-modifying the metal oxide-silica composite gel to prepare a hydrophobic metal oxide-silica composite wet gel, and may be performed by adding a surface modifier to the metal oxide-silica composite gel and performing a reaction.

In this case, the preparation method according to the embodiment of the present invention may perform a step of treating the metal oxide-silica composite gel with alcohol before the surface modification of the metal oxide-silica composite gel. Herein, the step of treating with alcohol may include dispersing the metal oxide-silica composite gel in alcohol. The alcohol may be used in an amount of 2 times to 5 times the weight of the metal oxide-silica composite gel. The alcohol is not particularly limited, but may, for example, be methanol, ethanol, or a mixture thereof.

In the preparation method according to the embodiment of the present invention, since the metal oxide-silica composite gel is treated with alcohol, a portion of sodium ions ($Na^+$) present in the metal oxide-silica composite gel may not only be removed, but water present in the metal oxide-silica composite gel may also be substituted with the alcohol, and thus, the alcohol may play a role in preventing shrinkage and cracking of pores, which occur while the water present in the pores is vaporized into a vapor phase during drying of the hydrophobic metal oxide-silica composite wet gel prepared after the surface modification to be described later, even without a separate solvent substitution step. In addition, since the alcohol may increase reactivity with the surface modifier, the surface modification may be more easily performed.

Herein, the sodium ions ($Na^+$) are from the water glass, wherein the sodium ions ($Na^+$) may be generated by the reaction of the water glass with the metal ions to cause a substitution reaction between the sodium ions ($Na^+$) in the water glass and the metal ions.

As described above, the surface modification may be performed by adding the surface modifier to the metal oxide-silica composite gel and performing a reaction.

The surface modification according to an embodiment of the present invention may be performed by adding the surface modifier to the metal oxide-silica composite gel and performing a reaction. In this case, before the addition of the surface modifier, since the metal oxide-silica composite gel is treated with alcohol as described above, the metal oxide-silica composite gel may be in a state of being dispersed in the alcohol.

The surface modification according to another embodiment of the present invention may be performed by dispersing the metal oxide-silica composite gel in a non-polar organic solvent, then adding the surface modifier to the metal oxide-silica composite gel, and performing a reaction. In this case, before the metal oxide-silica composite gel is dispersed in the non-polar organic solvent, since the metal oxide-silica composite gel is treated with alcohol as described above, the metal oxide-silica composite gel may be in a state of being dispersed in the alcohol. Since the non-polar organic solvent is added thereto and mixed, the metal oxide-silica composite gel may be in a state of being dispersed in the non-polar organic solvent.

The non-polar organic solvent may play a role in preventing the shrinkage and cracking of pores, which may occur while water present in the pores of the hydrophobic metal oxide-silica composite wet gel is vaporized into a vapor phase during drying of step 3 to be described later, by substituting the water remaining in the pores of the metal oxide-silica composite gel or the prepared hydrophobic metal oxide-silica composite wet gel. Accordingly, a decrease in surface area and a change in pore structure, which occur during the drying of the hydrophobic metal oxide-silica composite wet gel to be described later, may be prevented. That is, the preparation method according to the embodiment of the present invention may perform an additional solvent substitution step by using the non-polar organic solvent, and thus, the preparation method according to the embodiment of the present invention may prepare a hydrophobic metal oxide-silica composite aerogel having more improved physical properties such as specific surface area and tap density. The non-polar organic solvent is not particularly limited, but may be a non-polar organic solvent and, specifically, may be at least one selected from the group consisting of hexane, heptane, toluene, and xylene.

The surface modifier may play a role in hydrophobically surface-modifying the metal oxide-silica composite gel by reacting with a hydrophilic group (—OH) of the metal oxide-silica composite gel. In this case, the surface modifier may be added in a molar ratio of 1.0 to 4.0 with respect to the water glass in the water glass solution initially used. Also, the surface modifier may be at least one selected from the group consisting of trimethylchlorosilane (TMCS), hexamethyldisilazane (HMDS), methyltrimethoxysilane, and trimethylethoxysilane.

Furthermore, the surface modification is not particularly limited, but may be performed by performing a surface modification reaction at a temperature of 55° C. to 65° C., and, in this case, reaction time may be within 1 hour. Also, the reaction may be performed while stirring, and, in this case, the stirring may be performed by rotating at 100 rpm to 300 rpm using a magnetic bar.

In the preparation method according to the embodiment of the present invention, since the washing and solvent substitution may be simultaneously performed by treating with the alcohol as described above, a separate solvent substitution step may be omitted and additional solvent substitution may be performed simultaneously with the surface modification if necessary, and thus, process steps and process time may be reduced to improve productivity and economic efficiency.

Step 3 is a step of drying the hydrophobic metal oxide-silica composite wet gel for the preparation of a hydrophobic metal oxide-silica composite aerogel.

In this case, in the preparation method according to the embodiment of the present invention, a step of washing may be further performed before the drying, and the washing is to obtain a high purity hydrophobic metal oxide-silica composite aerogel by removing impurities (e.g., unreacted products, by-products, etc.) generated during the reaction, wherein the washing is not particularly limited and may be performed by a conventional method in the art.

For example, the washing may be performed by adding a non-polar organic solvent to the hydrophobic metal oxide-silica composite wet gel and stirring for 20 minutes to 1 hour. The non-polar organic solvent may be the same as described above.

The drying may be performed by atmospheric pressure drying at a temperature of 105° C. to 190° C. for 1 hour to 4 hours, after a water layer is separated and removed from the hydrophobic metal oxide-silica composite wet gel.

Also, the present invention provides a hydrophobic metal oxide-silica composite aerogel prepared by the above preparation method.

The aerogel according to an embodiment of the present invention may be one in which silica is doped with metal oxide, and the metal oxide may be a combination of magnesium oxide (MgO) and calcium oxide (CaO). That is, the aerogel may include magnesium oxide (MgO), calcium oxide (CaO), and silica ($SiO_2$).

Herein, the doping denotes that a limited amount of a foreign material is added to a pure material, and, for example, may denote that the metal oxide is bonded in a crystal lattice of the silica.

The aerogel according to the embodiment of the present invention may have a specific surface area of 350 $m^2/g$ to 700 $m^2/g$.

Furthermore, the hydrophobic metal oxide-silica composite aerogel may have a tap density of 0.051 g/ml to 0.102 g/ml and may have a carbon content of 3.77 wt % to 9.23 wt %.

Hereinafter, the present invention will be described in more detail, according to the following examples and experimental examples. However, the following examples and experimental examples are merely presented to exemplify the present invention, and the scope of the present invention is not limited thereto.

Example 1

A hydrophobic metal oxide-silica composite aerogel was prepared through steps illustrated in FIG. 2.

Specifically, a metal ion solution ($Mg^{2+}:Ca^{2+}=2:1$ molar ratio) and hydrochloric acid were added to a water glass solution and mixed together to prepare a hydrophilic metal oxide-silica composite gel. In this case, the metal ion solution was added in an amount such that an amount of metal ions in the metal ion solution was 0.5 moles with respect to water glass in the water glass solution, and the hydrochloric acid was added until a pH value became 7. The prepared composite gel was treated with ethanol to remove sodium ions and perform primary solvent substitution. After 200 ml of hexane was added thereto and mixed together and trimethylchlorosilane was then added in an amount of 4.0 moles with respect to the water glass in the water glass solution, a reaction was performed at 55° C. for 1 hour to perform secondary solvent substitution and prepare a surface-modified hydrophobic metal oxide-silica composite wet gel at the same time. A hydrophobic metal oxide-silica composite aerogel was prepared by atmospheric pressure drying the prepared hydrophobic metal oxide-silica composite wet gel in an oven at 105° C. for 1 hour.

Example 2

A hydrophobic metal oxide-silica composite aerogel was prepared in the same manner as in Example 1 except that trimethylchlorosilane was used in an amount of 2.4 moles with respect to water glass.

Example 3

A hydrophobic metal oxide-silica composite aerogel was prepared in the same manner as in Example 1 except that trimethylchlorosilane was used in an amount of 2.0 moles with respect to water glass.

Example 4

A hydrophobic metal oxide-silica composite aerogel was prepared in the same manner as in Example 1 except that trimethylchlorosilane was used in an amount of 1.6 moles with respect to water glass.

Example 5

A hydrophobic metal oxide-silica composite aerogel was prepared in the same manner as in Example 1 except that trimethylchlorosilane was used in an amount of 1.2 moles with respect to water glass.

Example 6

A hydrophobic metal oxide-silica composite aerogel was prepared in the same manner as in Example 1 except that the metal ion solution was added in an amount such that an amount of metal ions is 1.0 mole with respect to water glass.

Example 7

A hydrophobic metal oxide-silica composite aerogel was prepared in the same manner as in Example 6 except that trimethylchlorosilane was used in an amount of 2.4 moles with respect to water glass.

Example 8

A hydrophobic metal oxide-silica composite aerogel was prepared in the same manner as in Example 6 except that trimethylchlorosilane was used in an amount of 2.0 moles with respect to water glass.

Example 9

A hydrophobic metal oxide-silica composite aerogel was prepared in the same manner as in Example 6 except that trimethylchlorosilane was used in an amount of 1.6 moles with respect to water glass.

Example 10

A hydrophobic metal oxide-silica composite aerogel was prepared in the same manner as in Example 6 except that trimethylchlorosilane was used in an amount of 1.2 moles with respect to water glass.

Example 11

A hydrophobic metal oxide-silica composite aerogel was prepared in the same manner as in Example 1 except that the secondary solvent substitution using hexane was not performed and surface modification was only performed after the primary solvent substitution by the ethanol treatment.

Example 12

A hydrophobic metal oxide-silica composite aerogel was prepared in the same manner as in Example 2 except that the secondary solvent substitution using hexane was not performed and surface modification was only performed after the primary solvent substitution by the ethanol treatment.

Comparative Example 1

A metal oxide-silica composite aerogel was prepared through steps illustrated in FIG. 1.

Specifically, a metal ion solution ($Mg^{2+}$:$Ca^{2+}$=2:1 molar ratio) and hydrochloric acid were added to a water glass solution and mixed together to prepare a hydrophilic metal oxide-silica composite wet gel. In this case, the metal ion solution was added in an amount such that an amount of metal ions in the metal ion solution was 0.5 moles with respect to water glass in the water glass solution, and the hydrochloric acid was added until a pH value became 7. The prepared wet gel was washed with distilled water to remove sodium ions. Thereafter, after the wet gel was aged at 60° C. for 1 hour, 200 ml of ethanol was added to perform primary solvent substitution, and hexane was added to perform secondary solvent substitution so that surface modification reactivity was improved. Thereafter, after trimethylchlorosilane was added to the secondary solvent-substituted wet gel in an amount of 4.0 moles with respect to the water glass in the water glass solution and a reaction was then performed at 55° C. for 1 hour, 100 ml of hexane was added to induce additional solvent substitution and surface modification reaction, and thus, a hydrophobic metal oxide-silica composite wet gel was prepared. A hydrophobic metal oxide-silica composite aerogel was prepared by atmospheric pressure drying the prepared hydrophobic metal oxide-silica composite wet gel in an oven at 105° C. for 1 hour.

Comparative Example 2

A hydrophobic metal oxide-silica composite aerogel was prepared in the same manner as in Comparative Example 1 except that trimethylchlorosilane was used in an amount of 2.4 moles with respect to water glass.

Comparative Example 3

A hydrophobic metal oxide-silica composite aerogel was prepared in the same manner as in Comparative Example 1 except that trimethylchlorosilane was used in an amount of 2.0 moles with respect to water glass.

Comparative Example 4

A hydrophobic metal oxide-silica composite aerogel was prepared in the same manner as in Comparative Example 1 except that trimethylchlorosilane was used in an amount of 1.6 moles with respect to water glass.

Comparative Example 5

A hydrophobic metal oxide-silica composite aerogel was prepared in the same manner as in Comparative Example 1 except that trimethylchlorosilane was used in an amount of 1.2 moles with respect to water glass.

Comparative Example 6

A hydrophobic metal oxide-silica composite aerogel was prepared in the same manner as in Comparative Example 1 except that the metal ion solution was added in an amount such that an amount of metal ions is 1.0 mole with respect to water glass.

Comparative Example 7

A hydrophobic metal oxide-silica composite aerogel was prepared in the same manner as in Comparative Example 6 except that trimethylchlorosilane was used in an amount of 2.4 moles with respect to water glass.

Comparative Example 8

A hydrophobic metal oxide-silica composite aerogel was prepared in the same manner as in Comparative Example 6 except that trimethylchlorosilane was used in an amount of 2.0 moles with respect to water glass.

Comparative Example 9

A hydrophobic metal oxide-silica composite aerogel was prepared in the same manner as in Comparative Example 6 except that trimethylchlorosilane was used in an amount of 1.6 moles with respect to water glass.

Comparative Example 10

A hydrophobic metal oxide-silica composite aerogel was prepared in the same manner as in Comparative Example 6 except that trimethylchlorosilane was used in an amount of 1.2 moles with respect to water glass.

Comparative Example 11

A hydrophobic metal oxide-silica composite aerogel was prepared in the same manner as in Example 1 except that the metal ion solution was added in an amount such that an amount of metal ions in the metal ion solution is 0.4 moles with respect to water glass in the water glass solution.

Comparative Example 12

A hydrophobic metal oxide-silica composite aerogel was prepared in the same manner as in Example 2 except that the metal ion solution was added in an amount such that an amount of metal ions in the metal ion solution is 0.4 moles with respect to water glass in the water glass solution.

Comparative Example 13

A hydrophobic metal oxide-silica composite aerogel was prepared in the same manner as in Example 3 except that the metal ion solution was added in an amount such that an amount of metal ions in the metal ion solution is 0.4 moles with respect to water glass in the water glass solution.

Comparative Example 14

A hydrophobic metal oxide-silica composite aerogel was prepared in the same manner as in Example 4 except that the metal ion solution was added in an amount such that an amount of metal ions in the metal ion solution is 0.4 moles with respect to water glass in the water glass solution.

Comparative Example 15

A hydrophobic metal oxide-silica composite aerogel was prepared in the same manner as in Example 5 except that the metal ion solution was added in an amount such that an amount of metal ions in the metal ion solution is 0.4 moles with respect to water glass in the water glass solution.

Comparative Example 16

A hydrophobic metal oxide-silica composite aerogel was prepared in the same manner as in Example 6 except that the metal ion solution was added in an amount such that an amount of metal ions in the metal ion solution is 0.4 moles with respect to water glass in the water glass solution.

Comparative Example 17

A hydrophobic metal oxide-silica composite aerogel was prepared in the same manner as in Example 7 except that the metal ion solution was added in an amount such that an amount of metal ions in the metal ion solution is 0.4 moles with respect to water glass in the water glass solution.

Comparative Example 18

A hydrophobic metal oxide-silica composite aerogel was prepared in the same manner as in Example 8 except that the metal ion solution was added in an amount such that an amount of metal ions in the metal ion solution is 0.4 moles with respect to water glass in the water glass solution.

Comparative Example 19

A hydrophobic metal oxide-silica composite aerogel was prepared in the same manner as in Example 9 except that the metal ion solution was added in an amount such that an amount of metal ions in the metal ion solution is 0.4 moles with respect to water glass in the water glass solution.

Comparative Example 20

A hydrophobic metal oxide-silica composite aerogel was prepared in the same manner as in Example 10 except that the metal ion solution was added in an amount such that an amount of metal ions in the metal ion solution is 0.4 moles with respect to water glass in the water glass solution.

Experimental Example

Figure 4:
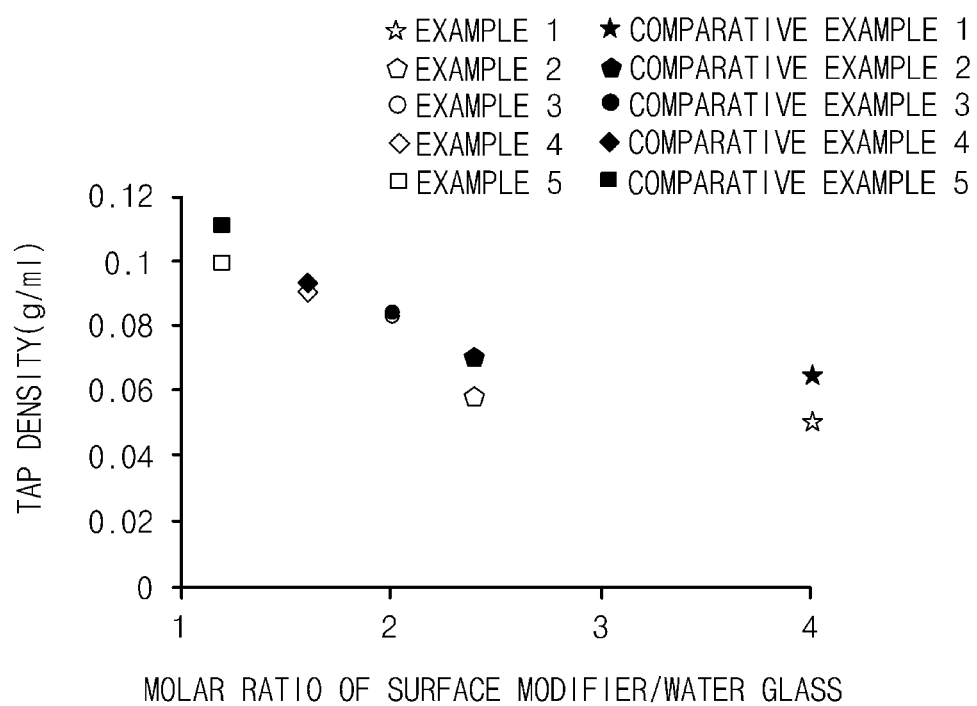
FIG. 4 is a graph in which tap densities of hydrophobic metal oxide-silica composite aerogels of Examples 1 to 5 according to an embodiment of the present invention and hydrophobic metal oxide-silica composite aerogels of Comparative Examples 1 to 5 are comparatively analyzed.
Figure 5:
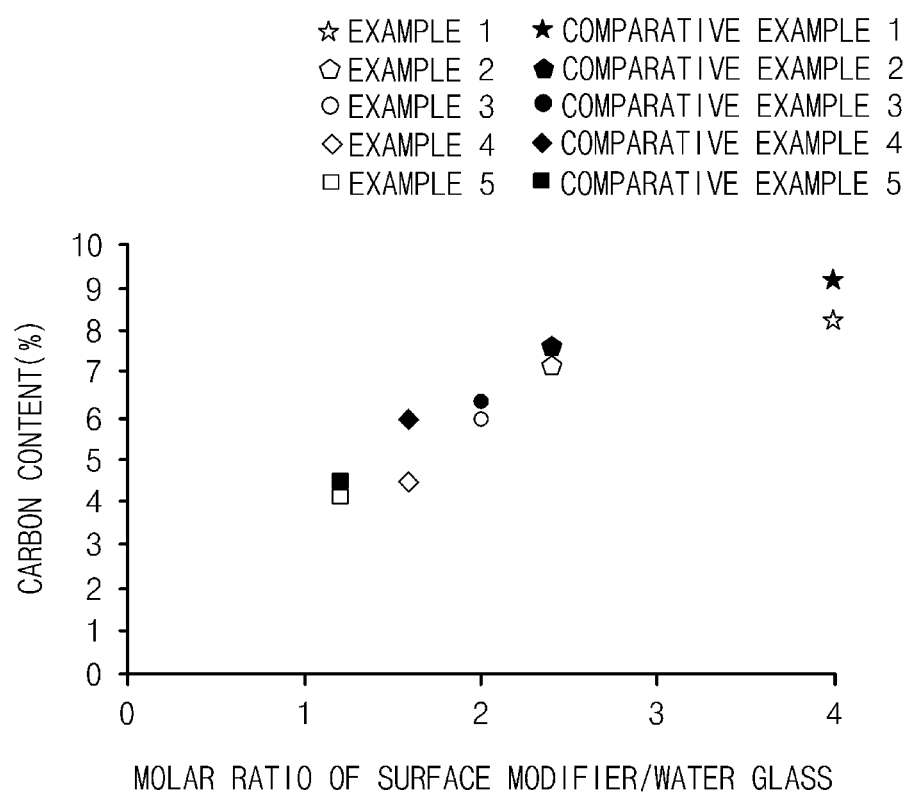
FIG. 5 is a graph in which carbon contents of the hydrophobic metal oxide-silica composite aerogels of Examples 1 to 5 according to the embodiment of the present invention and the hydrophobic metal oxide-silica composite aerogels of Comparative Examples 1 to 5 are comparatively analyzed.

In order to compare physical properties of the hydrophobic metal oxide-silica composite aerogels prepared in Examples 1 to 12 and Comparative Examples 1 to 20, tap density (g/ml), specific surface area (Brunauer-Emmett-Teller (BET), $m^2/g$), and carbon content (wt %) of each aerogel were measured. The results thereof are presented in Table 1 and FIGS. 3 and 4 below.

(1) Tap Density (g/Ml)

Tap density was measured using a tap density tester (TAP-2S, Logan Instruments, Co.).

Specifically, after a weight of each aerogel was measured by putting the each aerogel into a standardized cylinder (10 ml), the cylinder was then fixed to the tap density tester, a noise damping hood was closed, and 2,000 tappings were set. After tapping measurement was completed, a volume of each aerogel in the cylinder was measured, and density was measured by calculating a ratio of the weight previously measured to the volume.

(2) Specific Surface Area (BET, m²/g)

Specific surface areas were analyzed from amounts of nitrogen adsorbed and desorbed according to partial pressure ($0.11 < p/p_o < 1$) using an ASAP 2010 analyzer (Micromeritics).

Specifically, 100 mg of each aerogel was put in a cylinder and was subjected to a pretreatment at 180° C. for 8 hours, and the specific surface area was then measured using the specific surface area analyzer.

(3) Carbon Content (Wt %)

Carbon contents were measured using a carbon analyzer (Carbon-Sulfur Analyzer CS-2000, Eltra GmbH).

TABLE 1

| Category | Tap density (g/ml) | Carbon content (wt %) | Specific surface area (m²/g) |
|---|---|---|---|
| Example 1 | 0.051 | 9.23 | 452 |
| Example 2 | 0.058 | 7.66 | 478 |
| Example 3 | 0.083 | 6.38 | 546 |
| Example 4 | 0.091 | 5.99 | 588 |
| Example 5 | 0.099 | 4.51 | 609 |
| Example 6 | 0.061 | 8.18 | 470 |
| Example 7 | 0.068 | 6.08 | 466 |
| Example 8 | 0.081 | 5.91 | 582 |
| Example 9 | 0.095 | 4.03 | 591 |
| Example 10 | 0.102 | 3.77 | 655 |
| Example 11 | 0.067 | 6.99 | 412 |
| Example 12 | 0.077 | 7.01 | 368 |
| Comparative Example 1 | 0.066 | 8.31 | 382 |
| Comparative Example 2 | 0.071 | 7.22 | 304 |
| Comparative Example 3 | 0.084 | 6.01 | 395 |
| Comparative Example 4 | 0.09 | 4.54 | 452 |
| Comparative Example 5 | 0.111 | 4.21 | 441 |
| Comparative Example 6 | 0.071 | 8.88 | 511 |
| Comparative Example 7 | 0.078 | 8.18 | 536 |
| Comparative Example 8 | 0.079 | 7.96 | 421 |
| Comparative Example 9 | 0.102 | 3.86 | 553 |
| Comparative Example 10 | 0.123 | 3.51 | 478 |
| Comparative Example 11 | 0.152 | 6.45 | 315 |
| Comparative Example 12 | 0.166 | 4.17 | 356 |
| Comparative Example 13 | 0.184 | 4.21 | 298 |
| Comparative Example 14 | 0.191 | 3.56 | 268 |
| Comparative Example 15 | 0.201 | 3.14 | 250 |
| Comparative Example 16 | 0.175 | 5.99 | 240 |
| Comparative Example 17 | 0.188 | 5.21 | 245 |
| Comparative Example 18 | 0.201 | 3.17 | 220 |
| Comparative Example 19 | 0.222 | 3.12 | 207 |
| Comparative Example 20 | 0.231 | 2.57 | 188 |

As illustrated in Table 1, it was confirmed that the hydrophobic metal oxide-silica composite aerogels of Examples 1 to 12 prepared according to the embodiment of the present invention generally had low tap densities and increased carbon contents while having improved specific surface area characteristics in comparison to the hydrophobic metal oxide-silica composite aerogels of Comparative Examples 1 to 20.

Specifically, it was confirmed that the hydrophobic metal oxide-silica composite aerogels of Comparative Examples 1 to 10, which were prepared by a conventional general method of preparing a hydrophobic metal oxide-silica composite aerogel, had relatively higher tap densities, smaller specific surface areas, and significantly reduced carbon contents in comparison to the hydrophobic metal oxide-silica composite aerogels of Examples 1 to 10. For example, as a result of comparing the hydrophobic metal oxide-silica composite aerogels of Example 1 and Comparative Example 1 which were prepared by using the same materials and the same amounts of the materials, with respect to the hydrophobic metal oxide-silica composite aerogel of Example 1, the tap density was reduced to a level of about 77%, the specific surface area was increased to about 18%, and the carbon content was increased to about 12% in comparison to the hydrophobic metal oxide-silica composite aerogel of Comparative Example 1.

Also, as a result of comparing the hydrophobic metal oxide-silica composite aerogels of Comparative Examples 11 to 15, which were prepared by the preparation method according to the embodiment of the present invention, but were prepared by using the metal ion solution in an amount such that the metal ion concentration with respect to the water glass was less than the range suggested by the present invention, respectively with the hydrophobic metal oxide-silica composite aerogels of Examples 1 to 5 which were prepared by respectively using the same amounts of the surface modifier, it was confirmed that the tap densities were increased, the specific surface areas were reduced, and the carbon contents were significantly reduced. For example, as a result of comparing the hydrophobic metal oxide-silica composite aerogel (metal ion/water glass=0.4/1.0 mole) of Comparative Examples 11 and the hydrophobic metal oxide-silica composite aerogel (metal ion/water glass=0.5/1.0 mole) of Example 1, in which other conditions were the same, but the metal ion concentrations with respect to the water glass were different, the tap density of the hydrophobic metal oxide-silica composite aerogel of Example 1 was reduced to a level of 33%, the specific surface area was increased to 43%, and the carbon content was significantly increased to 143%.

In addition, as a result of comparing the hydrophobic metal oxide-silica composite aerogels of Comparative Examples 16 to 20, which were prepared by the preparation method according to the embodiment of the present invention, but were prepared by using the metal ion solution in an amount such that the metal ion concentration with respect to the water glass was greater than the range suggested by the present invention, respectively with the hydrophobic metal oxide-silica composite aerogels of Examples 6 to 10 which were prepared by respectively using the same amounts of the surface modifier, it was confirmed that the tap densities were increased, the specific surface areas were reduced, and the carbon contents were significantly reduced. For example, as a result of comparing the hydrophobic metal oxide-silica composite aerogel (metal ion/water glass=1.25/1.0 mole) of Comparative Examples 16 and the hydrophobic metal oxide-silica composite aerogel (metal ion/water glass=1.0/1.0 mole) of Example 6, in which other conditions were the same, but the metal ion concentrations with respect to the water glass were different, the tap density of the hydrophobic metal oxide-silica composite aerogel of Example 6 was reduced to a level of 34%, the specific surface area was increased about two times, and the carbon content was significantly increased to 137%.

The invention claimed is:

1. A method of preparing a hydrophobic, co-precipitated metal oxide-silica aerogel, the method comprising steps of:
   (1) adding a metal ion solution and an acid catalyst to a water glass solution and mixing together to prepare a metal oxide-silica gel;
   (2) surface-modifying the co-precipitated metal oxide-silica gel to prepare a hydrophobic, co-precipitated metal oxide-silica wet gel; and
   (3) drying the hydrophobic co-precipitated metal oxide-silica wet gel,
   wherein the method further comprises treating the co-precipitated metal oxide-silica gel with alcohol before the surface modification of step 2, and
   wherein the metal ion solution is a binary metal ion solution including calcium ions ($Ca^{2+}$) and magnesium ions ($Mg^{2+}$).

2. The method of claim 1, wherein a concentration of water glass in the water glass solution is in a range of 0.1 M to 2.0 M.

3. The method of claim 1, wherein a concentration of metal ions in the metal ion solution is in a range of 0.05 M to 2.0 M.

4. The method of claim 1, wherein the drying of step (3) is performed by atmospheric pressure drying at a temperature of 105° C. to 190° C. for 1 hour to 4 hours.

5. The method of claim 1, wherein a molar ratio of the calcium ion ($Ca^{2+}$) to the magnesium ion ($Mg^{2+}$) in the metal ion solution is in a range of 1:0.3 to 1:3.

6. The method of claim 1, wherein the metal ion solution is added in an amount such that a molar ratio of metal ions to water glass is in a range of 0.5 to 1.

7. The method of claim 1, wherein step 1 is performed at a pH of 6 to 8.

8. The method of claim 1, wherein the acid catalyst comprises at least one selected from the group consisting of hydrochloric acid, nitric acid, acetic acid, sulfuric acid, and hydrofluoric acid.

9. The method of claim 1, wherein the alcohol comprises at least one selected from the group consisting of methanol and ethanol.

10. The method of claim 1, wherein the surface modification of step 2 is performed by adding a surface modifier to the co-precipitated metal oxide-silica gel and performing a reaction.

11. The method of claim 10, wherein the surface modifier comprises at least one selected from the group consisting of trimethylchlorosilane (TMCS), hexamethyldisilazane (HMDS), methyltrimethoxysilane, and trimethylethoxysilane.

12. The method of claim 10, wherein the surface modifier is added in a molar ratio of 1.0 to 4.0 with respect to water glass.

13. The method of claim 1, wherein the surface modification of step 2 is performed by dispersing the co-precipitated metal oxide-silica gel in a non-polar organic solvent, adding a surface modifier, and performing a reaction.

14. The method of claim 13, wherein the non-polar organic solvent comprises at least one selected from the group consisting of hexane, heptane, toluene, and xylene.

15. The method of claim 1, wherein the surface modification is performed at a temperature of 55° C. to 65° C.

* * * * *